United States Patent
Organ et al.

[11] Patent Number: 5,324,047
[45] Date of Patent: Jun. 28, 1994

[54] THREAD SEAL

[75] Inventors: Alan H. Organ; Robert M. Smith, both of Cheltenham, Great Britain

[73] Assignee: Dowty Seals Limited, Tewkesbury, Great Britain

[21] Appl. No.: 924,018
[22] PCT Filed: Jan. 23, 1992
[86] PCT No.: PCT/GB92/00133
§ 371 Date: Nov. 4, 1992
§ 102(e) Date: Nov. 4, 1992
[87] PCT Pub. No.: WO92/13219
PCT Pub. Date: Aug. 6, 1992

[30] Foreign Application Priority Data

Jan. 24, 1991 [GB] United Kingdom ............... 9101599

[51] Int. Cl.⁵ ............................................. F16J 15/16
[52] U.S. Cl. ..................................... 277/24; 277/167; 277/203
[58] Field of Search ............... 277/24, 137, 167, 203; 74/424.8 R, 459

[56] References Cited

U.S. PATENT DOCUMENTS

| | | |
|---|---|---|
| 2,757,548 | 8/1956 | Smith et al. ............ 74/459 X |
| 2,818,745 | 1/1958 | Spontelli ................. 74/459 |
| 3,116,931 | 1/1964 | Edwards ............... 74/459 X |
| 3,643,521 | 2/1972 | Nilsson . |
| 3,669,460 | 6/1972 | Wysong . |
| 4,052,076 | 10/1977 | Wysong . |
| 4,131,286 | 12/1978 | Bainard . |
| 4,175,475 | 11/1979 | Eckhardt . |
| 4,286,793 | 9/1981 | Ploss et al. .......... 277/203 X |
| 4,407,511 | 10/1983 | Benton et al. ............. 277/24 |
| 4,644,811 | 2/1987 | Tervo ................ 74/424.8 R X |
| 4,905,533 | 3/1990 | Benton et al. .......... 277/24 X |
| 5,029,877 | 7/1991 | Fedeli ................. 277/203 X |

FOREIGN PATENT DOCUMENTS

| | | |
|---|---|---|
| 0071332 | 2/1983 | European Pat. Off. . |
| 3418738 | 11/1985 | Fed. Rep. of Germany . |
| 1373936 | 2/1988 | U.S.S.R. ................. 74/459 |
| 1574256 | 9/1980 | United Kingdom . |
| 2123904 | 2/1984 | United Kingdom . |
| 2218757 | 11/1989 | United Kingdom . |
| 2223282 | 4/1990 | United Kingdom . |

Primary Examiner—William A. Cuchlinski, Jr.
Assistant Examiner—Scott W. Cummings
Attorney, Agent, or Firm—Young & Thompson

[57] ABSTRACT

A thread seal comprises a helical rib (6) for use with a threaded member (1). The end portions (7) of the rib (6) are axially staggered and are joined by a transverse thread bridging member (8) which engages a crest (9) of the thread between successive turns of the groove (2). The rib (6) has a tapering cross-section to project radially into the groove (2) and to form a lip seal over a limited axial width of the groove (2) throughout the greater part of the circumferential length of the rib (6). The end portions (7) together with the bridging member (8) are shaped to form a seal over the full axial width of the thread profile. By limiting the area of contact between the rib (6) and groove (2) over the greater part of the circumferential length of the rib (6) the frictional force between them is reduced.

18 Claims, 4 Drawing Sheets

THREAD SEAL

This invention relates to a thread seal, for use with a threaded member, of the type comprising a helical rib with axially staggered ends joined by a transverse thread bridging member, the rib serving to cooperate with the thread groove of the threaded member so as to form a seal.

Such seals are often used in conjunction with ball thread actuator systems to prevent leakage of grease from the system. The systems are used in aircraft to set the positions of flying surfaces such a landing flaps and are often exposed to the elements. It will therefore be appreciated that the seal must also prevent the ingress of dirt and water. The seals have therefore been made to closely conform to match the shape of the groove thread in order to provide an efficient seal. However such arrangements require a considerable expenditure of power in order to overcome the friction between the seal and the threaded member. This problem is further compounds by the seal absorbing grease and swelling.

According to one aspect, the invention consists in a thread seal for forming a seal about a threaded member comprising at least one rib for sealingly engaging a thread groove and at least one axially extending thread-bridging member connected between adjacent end portions one rib or a pair of ribs to form a complete circumferential seal about the threaded member wherein the rib or ribs each have a tapering cross-section to project radially into the groove to form a lip seal over a limited axial width of the groove throughout the greater part of the circumferential length of the rib.

Because of the limited area of contact between the rib and the thread groove, the frictional force between them is reduced. Furthermore, the area of contact of the end portions with the threaded member can be limited to that lying axially between the lip seal formed by these end portions.

In a first embodiment of the invention, a single helical rib, which extends about the full circumference of the threaded member, has its axially staggered end portions joined by a bridging member. In a second embodiment, a plurality of ribs are provided each extending only part of the way about the full circumference with their end portions axially adjacent one another and joined by a bridging member. The second embodiment of the invention is preferred for use with a threaded member having a multistart thread, the ribs engaging adjacent grooves of the thread.

According to another aspect, the invention consists in a seal assembly adapted for use with a threaded member, comprising a thread seal and an ice chipper, the thread seal comprising at least one helical rib having axially staggered end portions which end portions are joined together or to end portions of an adjacent rib or ribs by at least one transverse thread bridging member so as to cooperate with the threaded member to form a complete annular seal therewith, and the ice chipper being adapted to extend over a short length of the thread of the threaded member and being located circumferentially adjacent to the bridging member of the seal so as to lie within the axial length of the seal.

According to a further aspect of the invention, there is provided a thread seal for forming a circumferential seal about a multi-threaded member having formed therein a plurality of thread grooves, the seal comprising at least two ribs in sealing engagement with at least two of said grooves, and with adjacent end portions of the ribs being joined by a transverse thread-bridging member to complete the seal.

By forming the seal with ribs engaging different grooves of the threaded member it is possible to produce a thread seal which is more axially compact that would otherwise be possible.

A specific embodiment of the invention will now be described, by way of example only, with reference to the drawings in which.

Figure 1:
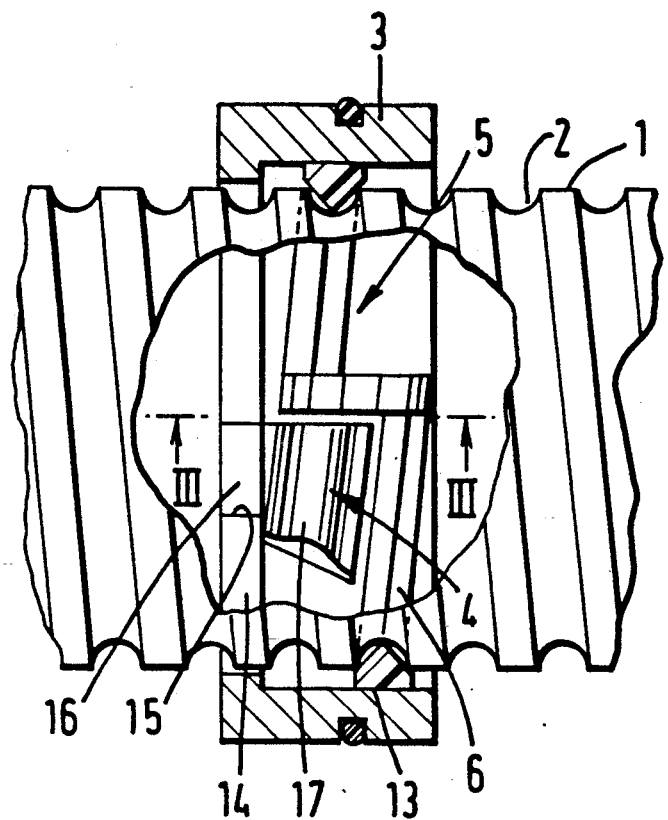
FIG. 1 shows a partial section through part of a ball thread actuator system employing a thread seal in accordance with the invention.
Figure 2:
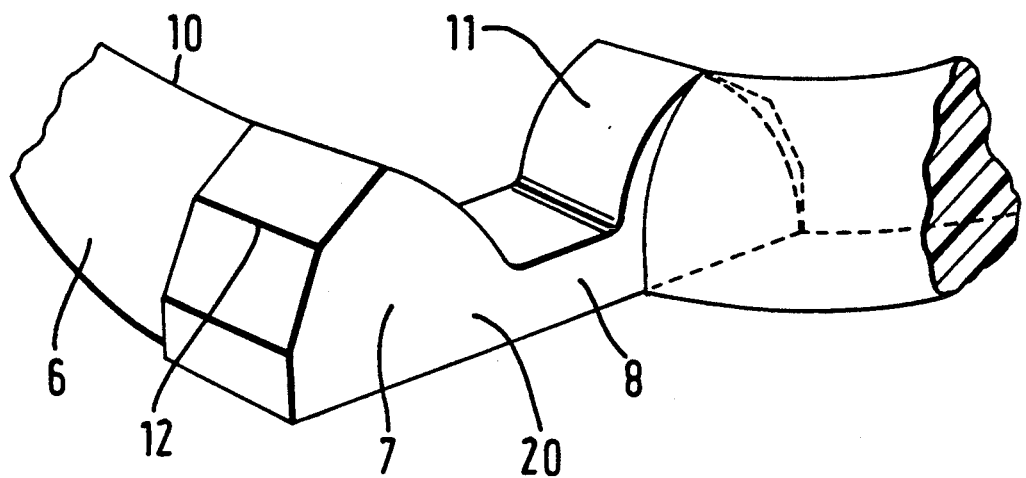
FIG. 2 is a view of the bridging member of a thread seal removed from its carrier.

With reference to FIG. 1, a ball thread actuator system comprises an actuator rod 1 having formed therein along its length a spherical or ball thread defined by the groove 2. About the rod 1 is positioned a short sleeve 3 which is fixed and supports within it a thread seal 5 and an ice chipper 4. The seal 5 is moulded from polyurethane and comprises a helical rib 6 with a pitch to match that of the thread groove 2 and with end portions 7 joined by a thread-bridging member 8, as shown in FIG. 2. The rib 6 projects radially inwards to engage the groove 2, and the bridging member 8 engages the crest 9 of the thread between successive turns of the groove 2.

The rib 6 has, over the whole of its circumferential length except for its end portions 7, a cross-section as shown in outline in FIG. 1 which tapers to an apex 10. It is this apex 10 which forms a lip seal by abutting the groove 2 over a limited portion of its axial width at the deepest point.

Figure 3:
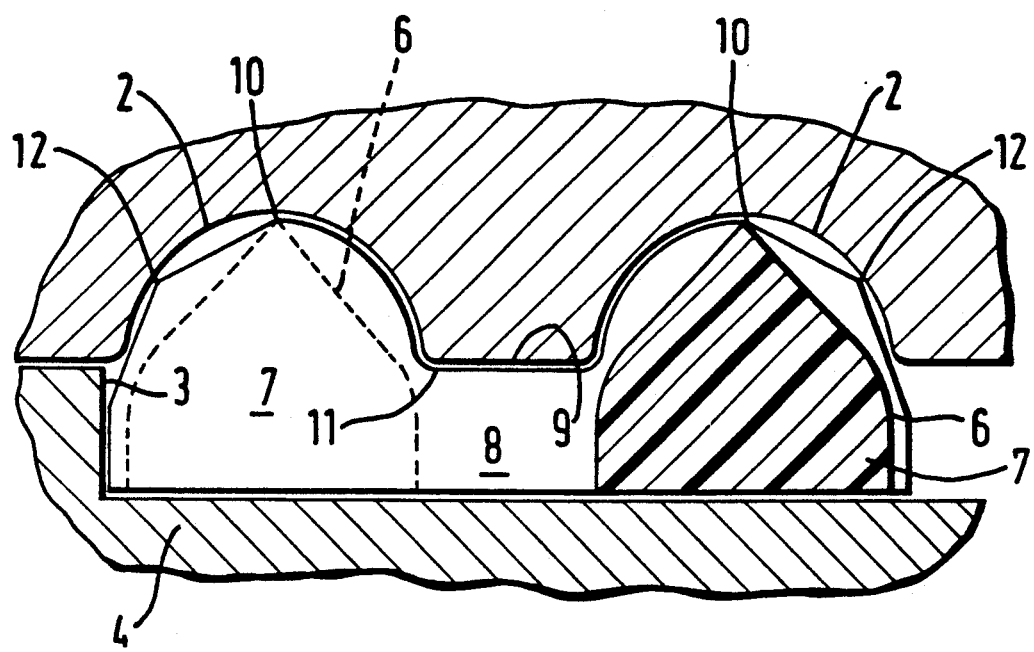
FIG. 3 is an enlarged axial cross-sectional view through the bridging member of the thread seal along the line 3—3 in FIG. 1.
Figure 4:
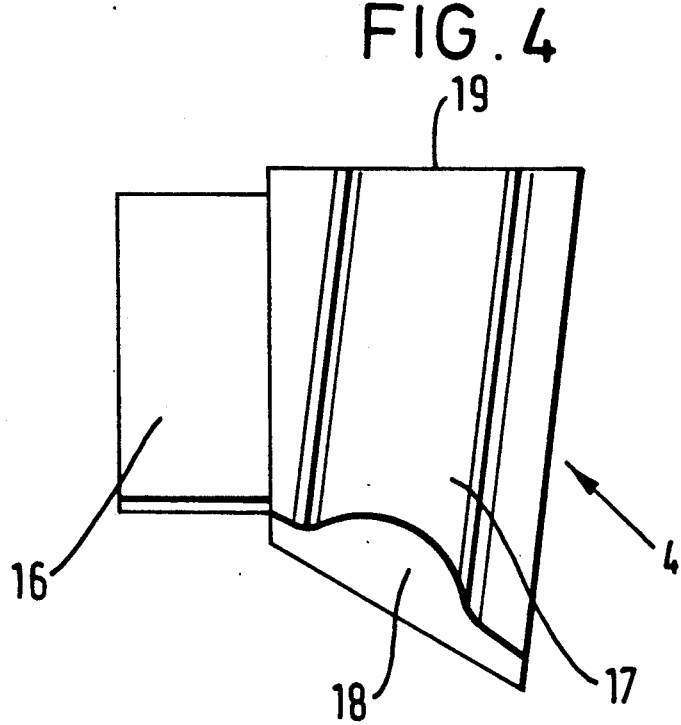
FIG. 4 is a view of the ice chipper used with the thread seal in FIG. 1.

The inner surface 11 of the end portions 7 and the bridging member between the apices 10 at adjacent ends of the rib 6, is shaped to conform to the shape of the groove 2 and crest 9 between successive turns of the groove, as shown in FIG. 3. Thus the end portions 7 and bridging member 8 form a seal between these apices 10 which, completes an annular seal around the actuator rod 1 between the rod and the sleeve 3.

On each side of the inner sealing surface 11, the inner surface of the end portions 7 is shaped to taper to an apex 12 which engages the groove 2 to assist axial location and support of the end portions 7 and bridging member 8 in sealing engagement with the thread. The line contact between the apices 12 and the groove 2 limits the area of contact of the seal with the seal carrier and therefore limits the frictional force between the two.

The design of the thread seal 5 as described above is such as to minimise the area of contact between the seal and the actuator rod 1, thereby minimising the frictional forces acting between the two. Further, this area of contact between the seal and the rod is less than that between the seal and the outer sleeve 3 at the annular interface 13 between the two so that the greater frictional forces at the interface 13 tend to hold the seal axially fixed within the sleeve as the rod 1 is rotated in operation.

The ice chipper 4 is located closely adjacent to the thread seal 5 on that side towards the external atmosphere and serves to chip ice from the groove 2 as the rod retracts towards the seal, thereby protecting the seal against possible ice damage. An inwardly projecting annular step 14 is provided at this outermost end of the sleeve 3 and is formed with a lateral slot 15 in which a tab 16 of the chipper engages to key the two together. The ice chipping element itself comprises a member 17 having the same cross-section as the space between the rod and sleeve over the axial width of the groove 2 and part of the crests 9 each side. This member 17 extends a short length of the groove 2 and has a leading end face 18 which is slanted at an angle across the width of the groove, as shown in FIG. 1, so as to produce a shearing action when engaging and removing ice from the groove. The rear face 19 of the member 17 is also angled slightly so as to meet the side face 20 of the bridging member 8 and end portions 7 of the seal in face-to-face contact if there is any relative movement of the seal, although as indicated above this is unlikely because of the greater frictional force at the interface 13 between the seal and the sleeve 3.

It will be appreciated that the ice chipper 4 because it extends over only a short part of the circumference of the actuator rod 1, can be located in the angle between the rib 6 and bridging member 8 of the seal, as shown in FIG. 1, thereby producing an axially more compact assembly as compared with known ice chipper which extend the full circumference of the rod.

Preferably, the ice chipper 14 is moulded from nylon.

Figure 5:
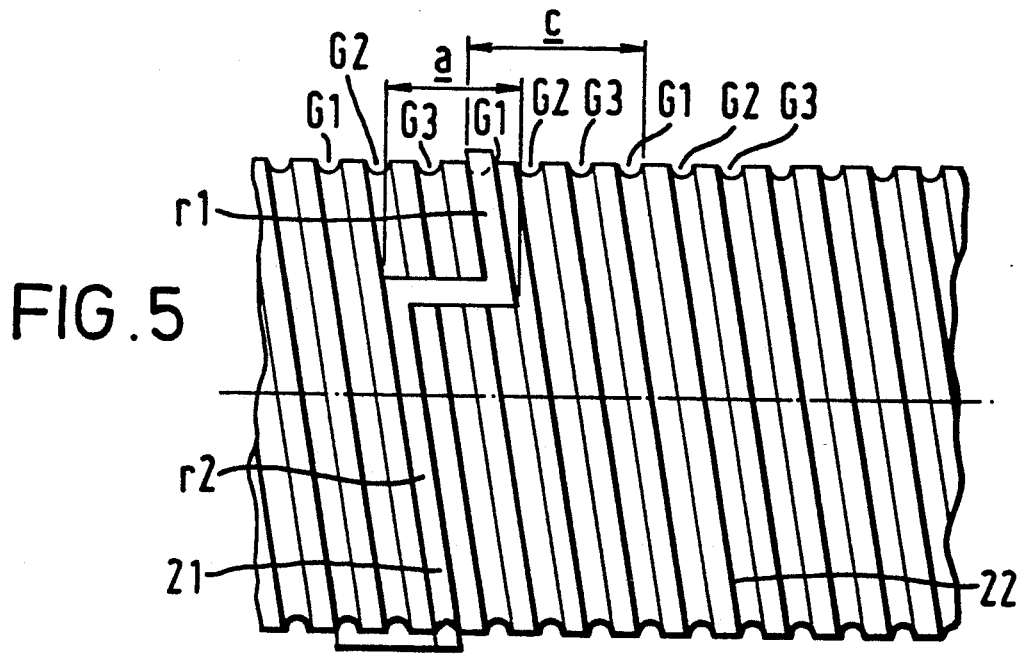
FIG. 5 shows a multistart thread seal in accordance with a second aspect of the invention.
Figure 6:
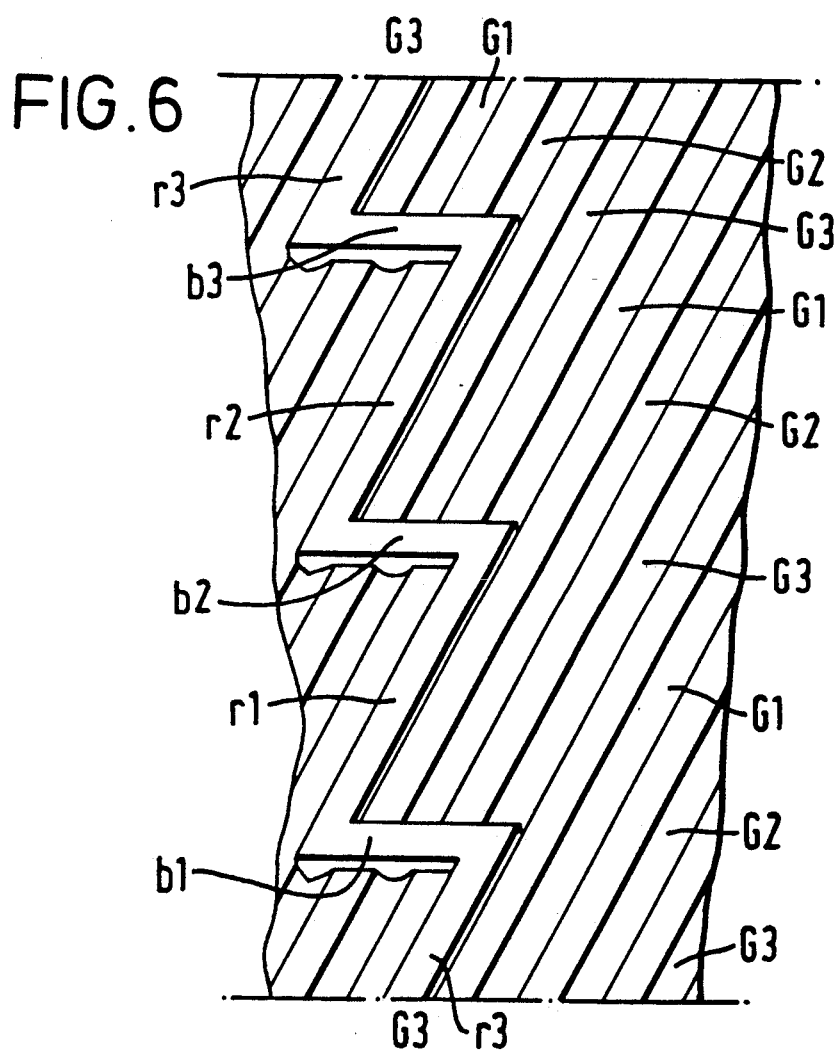
FIG. 6 is a projection of the seal shown in FIG. 5.

FIG. 5 shows an embodiment of the second aspect of the invention, in which a thread seal 21 is used to form a circumferential seal about a multistart ballscrew actuator 22. Formed in the surface of the actuator 22 are spherical non-intersecting grooves G1 to G3. There are three groove engaging ribs r1, r2 and r3 only two of which can be seen in FIG. 5. As more clearly shown in the projection of FIG. 6, rib r1 lies in sealing engagement within part of the circumferential length of G1. Similarly r2 and 43 lie in sealing engagement with G2 and G3, respectively. The combined length of the ribs is equivalent to one circumferential groove length. As in the earlier described embodiment, the ribs have a sharp apex to form a lip seal over a limited axial width of the deepest part of each groove.

The ends of the ribs are joined by thread bridging members b1, b2 and b3. Bridging member b1 bridges the thread profile between ribs r1 and r3, bridging member b2 bridges the thread profile between ribs r1 and r2, and bridging member b3 bridges the thread profile between ribs r2 and r3.

Figure 7:
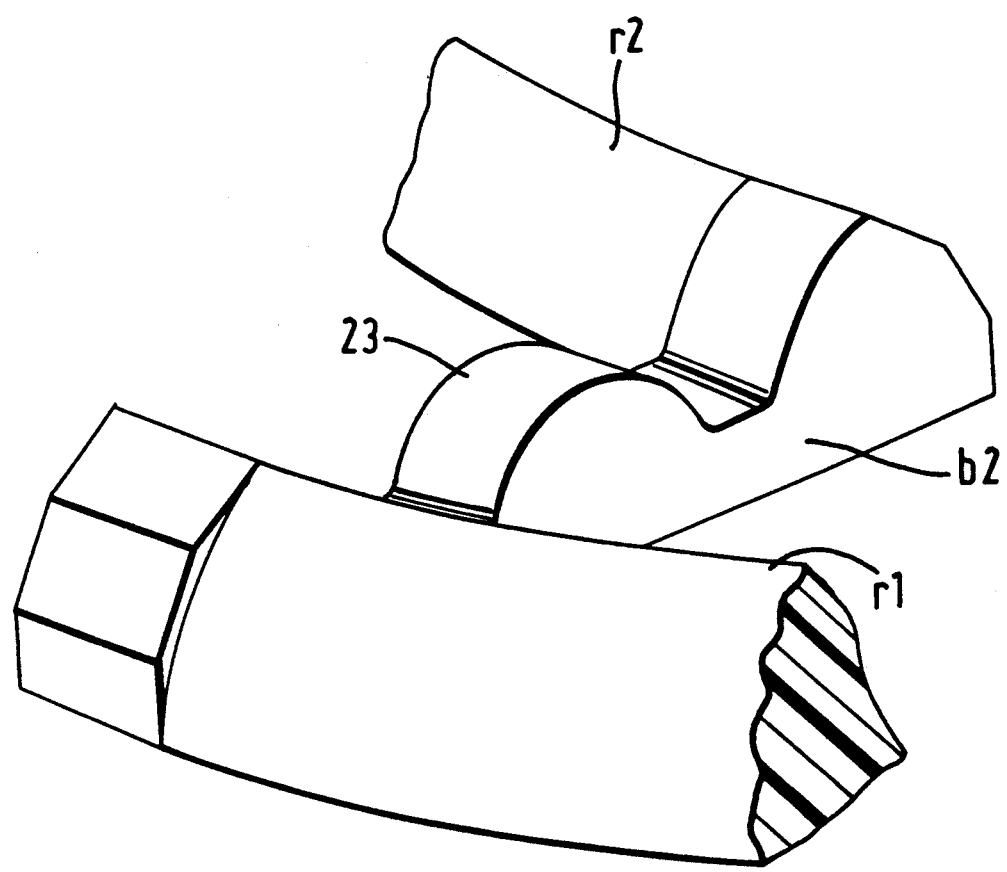
FIG. 7 is an enlarged view of a thread bridging member.

An enlarged view of bridging member b2 is shown in FIG. 7 and it can be seen that its form is similar to the earlier described bridging member 8 of FIGS. 1 to 3 except that it includes an intermediate hemispherical groove engaging portion 23. This matches the groove profile and forms a full width seal in the intermediate groove G3.

In FIG. 5, it can be seen that the seal 21 lies within an axial length a equivalent to three groove widths offering a more compact arrangement than would be possible if the full circumferential length were formed by one rib lying in one groove. In that case, the bridging member would extend from groove G1 across grooves G2 and G3 to groove G1, that is to say, the seal would lie within an axial length c of four grooves.

In alternative embodiments of the invention, differing number of ribs and bridging members may be employed.

We claim:

1. A thread seal for forming a seal about a threaded member comprising a helically extending rib for sealingly engaging a thread groove and an axially extending thread-bridging member connected between adjacent end portions said rib to form a complete circumferential seal entirely about the threaded member, wherein the rib has a tapering cross-section to project radially into the groove to form a lip seal over a limited axial width of the groove throughout the greater part of the circumferential length of the rib.

2. A thread seal as claimed in claim 1 wherein said bridging member joins said end portions of said rib in adjacent grooves.

3. A thread seal as claimed in claim 1 wherein at least one end portion comprises a groove locating region to support the end portions and bridging member in sealing engagement.

4. A thread seal as claimed in claim 3 wherein the locating region is tapered to provide a line contact.

5. A thread seal as claimed in claim 1 adapted for use with an outer sleeve such that the area of contact between the seal and the sleeve is greater than the area of contact between the seal and the threaded member.

6. A thread seal as claimed in claim 1 in combination with an ice chipper adapted to extend over a short length of the thread of the threaded member and being located circumferentially adjacent to the bridging member of the seal so as to lie within the axial length of the seal.

7. A seal assembly as claimed in claim 6 wherein the ice chipping element has a leading end face slanted at an angle across the width of the thread.

8. A seal assembly as claimed in claim 6 wherein the ice chipping element engages with the outer sleeve by means of a tab and slot.

9. A seal assembly as claimed in claim 6 wherein the ice chipping element is moulded from nylon.

10. A thread seal for forming a seal about a multi-threaded member comprising a plurality of ribs for sealingly engaging thread grooves and a plurality of axially extending thread-bridging members, each connected between adjacent end portions of a pair of ribs to form a complete circumferential seal entirely about the threaded member, wherein the ribs each have a tapering cross-section to project radially into one of said grooves to form a lip seal over a limited axial width of the groove throughout the greater part of the circumferential length of the rib.

11. A thread seal as claimed in claim 10 wherein each bridging member joins said end portions of said ribs in adjacent grooves.

12. A thread seal as claimed in claim 10 wherein at least one end portion comprises a groove locating region to support the end portion and bridging member in sealing engagement.

13. A thread seal as claimed in claim 12 wherein the locating region is tapered to provide a line contact.

14. A thread seal as claimed in claim 10 adapted for use with an outer sleeve such that the area of contact between the seal and the sleeve is greater than the area of contact between the seal and the threaded member.

15. A seal assembly adapted for use with a threaded member, comprising a thread seal as claimed in claim 10 in combination with an ice chipper adapted to extend over a short length of the thread of the threaded member and being located circumferentially adjacent to the bridging member of the seal so as to lie within the axial length of the seal.

16. A seal assembly as claimed in claim 15 wherein the ice chipping element has a leading end face slanted at an angle across the width of the thread.

17. A seal assembly as claimed in claim 16 wherein the ice chipping element engages with the outer sleeve by means of a tab and slot.

18. A seal assembly as claimed in claim 17 wherein the ice chipping element is moulded from nylon.

* * * * *